A. W. WILLIAMS.
Braid-Pin.

No. 223,620.  Patented Jan. 13, 1880.

Witnesses.
Chas. Wahlers.
William Miller.

Inventor.
Albert W. Williams
by Van Santvoord & Hauff
his attys.

UNITED STATES PATENT OFFICE.

ALBERT W. WILLIAMS, OF LEOMINSTER, MASSACHUSETTS.

BRAID-PIN.

SPECIFICATION forming part of Letters Patent No. 223,620, dated January 13, 1880.

Application filed October 17, 1879.

*To all whom it may concern:*

Be it known that I, ALBERT WARREN WILLIAMS, of Leominster, Worcester county, Massachusetts, have invented a new and useful Improvement in Braid-Pins, which invention is fully set forth in the following specification, reference being had to the accompanying drawings, in which—

Figure 1:
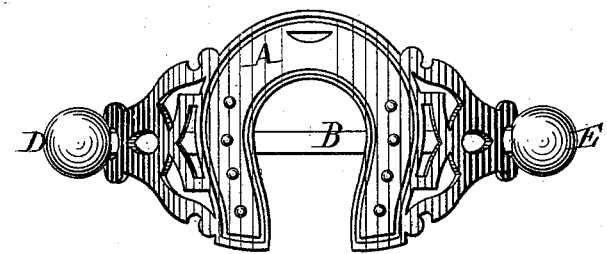
Figure 2:
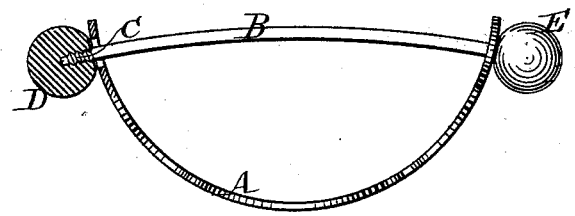

Figure 1 represents a front view of my improved braid-pin. Fig. 2 is a top view of the same, partly in section.

Similar letters indicate corresponding parts.

This invention relates to ornaments and pins for securing the hair.

The invention consists in the method of securing the locking-pin to the clasp, which I accomplish by means of a screw-thread formed on the end or ends of the pin and a nut or nuts adapted to be screwed onto the pin where the ends project through the clasp.

In the example of my invention shown in the drawings the letter A designates the clasp or face-plate of the device, which may be made of any desired ornamental character or design. It is curved in a longitudinal direction, as shown in Fig. 2, so as to be capable of receiving or embracing the hair or braid which it is intended to clasp. The ends of the clasp A are perforated to allow the insertion through them of the pin B, whose ends, or one of whose ends, is provided with a screw-thread, C, to receive a nut, D, which is screwed upon the threaded end or ends of the locking-pin where the same projects through and beyond the face of the clasp. In the present example I have shown only one end of the locking-pin provided with a screw-thread, the other end of the pin being provided with a head, E, permanently secured thereon.

In applying the device to use the clasp is placed with its concave side over or next to the braid or hair, and the pin, its nut D having been previously removed, is inserted through the holes in the ends of the clasp, so as to inclose the braid between it and the concave surface of the clasp, the threaded end of the pin projecting out from the opposite end of the clasp, so that the nut D can be screwed upon it, and the pin be thereby held in place, the clasp being held on the pin by the head E at one end and the nut D at the other.

The head of the pin, as well as the locking-nut, can be made of any suitable ornamental character. In the present instance I have made them spherical and of similar size; but I do not restrict myself to the form here shown. The clasp, as well as the other parts, can be made of shell, metal, rubber, or any other suitable material.

If desired, the pin B may be made to project through and beyond the nut D, and in that case the screw-thread C is formed on a suitable part of the pin, within the end thereof.

I am aware of the patent to Grant and Downs, No. 48,677, dated July 11, 1865, for a head-dress consisting of a clasp made of horn or the hoofs of animals, and which is in the market, provided with a pin passing through perforations in the ends of the clasp, the ends projecting through the clasp being provided with removable balls which are connected by an elastic cord which has a tendency to keep the balls on the ends of the pin; but such construction of clasp is objectionable, for the reason that one or both of the balls is very liable to become displaced by reason of being entangled in the hair or otherwise, and then there will be nothing to retain the pin in place; hence it will work out and the entire clasp will fall off and be lost. This I effectually overcome by my invention, inasmuch as one of the caps or balls is permanently attached to the pin, while the other, when in place, is not liable to work loose and cannot be slipped off the pin, owing to the screw-threads.

What I claim as new, and desire to secure by Letters Patent, is—

The pin B, having a head, E, at one end and a screw-thread, C, at the other end, for receiving a removable screw nut or head, D, in combination with the clasp A, having an opening at each end, through which said pin passes, and is detachably confined in place by the screw-nut, substantially as described.

In testimony whereof I have hereunto set my hand.

A. W. WILLIAMS.

Witnesses:
H. E. KINGMAN,
CHAS. WAHLERS.